United States Patent [19]

Sakamoto et al.

[11] 4,425,369
[45] Jan. 10, 1984

[54] CHEESE-CONTAINING COMPOSITION FOR DESSERT MAKING AND PROCESS FOR PRODUCING THE SAME

[75] Inventors: Kenshi Sakamoto; Akira Doi, both of Sennan, Japan

[73] Assignee: Fuji Oil Company, Ltd., Osaka, Japan

[21] Appl. No.: 297,973

[22] Filed: Aug. 31, 1981

[30] Foreign Application Priority Data

Sep. 1, 1980 [JP] Japan ................. 55-121425

[51] Int. Cl.$^3$ ............... A23C 19/09; A23C 19/093
[52] U.S. Cl. ................. 426/582; 426/585; 426/602; 426/613; 426/564
[58] Field of Search ........... 426/582, 585, 602, 613, 426/578, 564, 576

[56] References Cited

U.S. PATENT DOCUMENTS

| | | | |
|---|---|---|---|
| 3,455,698 | 7/1969 | Vakaleris | 426/582 |
| 3,499,768 | 3/1970 | Moirano | 426/582 |
| 3,666,493 | 5/1972 | Bluemke | 426/578 |
| 4,254,156 | 3/1981 | De Socio et al. | 426/578 |
| 4,312,891 | 1/1982 | Eisfeldt | 426/578 |

FOREIGN PATENT DOCUMENTS 546445  9/1957  Canada ..................... 426/585

*Primary Examiner*—Jeanette M. Hunter
*Attorney, Agent, or Firm*—Wenderoth, Lind & Ponack

[57] ABSTRACT

A cheese-containing composition in the form of an oil-in-water type emulsion useful for dessert making such as cheese cake making which comprises cheese, a liquid selected from the group consisting of milk, skim milk, water and a mixture thereof, an emulsifier and, optionally, a fat ingredient. The cheese-containing composition can be produced by mixing the desired ingredients, homogenizing the resulting mixture, sterilizing the homogenized mixture and then cooling.

7 Claims, No Drawings

CHEESE-CONTAINING COMPOSITION FOR DESSERT MAKING AND PROCESS FOR PRODUCING THE SAME

The present invention relates to a cheese-containing composition for dessert making and a process for producing the same. Particularly, the composition of the present invention is suitable for cheese cake making.

Cheese cakes may be divided into baking (soufflé) and non-baking (rare) types and, in either type, cheese is admixed with sugar, butter, fresh cream, wheat flour (in case of soufflé type) and the like. In conventional cheese cake mixing, the mixture of cheese is further admixed with, for example, beaten egg white, that is, so called meringue to provide an increased volume to the mixture and to retain a body of the cake so made since the mixture is hardly whipped and it is difficult to make a cheese cake having an increased volume without admixing meringue.

However, this operation for admixing the mixture with meringue is troublesome. In addition, it requires great skill, otherwise even air cells in meringue itself disappear, which results in a poor body of the cake.

Thus, it has been said that cheese cake making is troublesome and requires great skill. It is presumed that this is due to the facts that air is hardly incorporated into the mixture of cheese and, even if air could be incorporated therein, the resulting air cells would be very unstable and that, when butter and the like are present in the mixture, they are insufficiently homogenized and hence fat globules thereof affect the air cells in meringue.

As a result of the present inventors' intensive study, it has been found that a cheese cake can be readily made by using a certain cheese-containing composition in the form of an oil-in-water type emulsion (hereinafter referred to as O/W emulsion) without great skill and that other desserts such as a cheese pudding and a cheese ice cream can be also readily made by using the composition.

One object of the present invention is to provide a cheese-containing composition for dessert making by which cheese cakes as well as other desserts can be readily made without great skill. Another object of the present invention is to provide a process for producing the composition. These objects as well as other objects and advantages of the present invention will become apparent to those skilled in the art from the following description.

According to the present invention, there is provided a cheese-containing composition for dessert making in the form of a homogenized O/W emulsion which comprises as essential ingredients cheese, a liquid selected from the group consisting of milk, skim milk, water and a mixture thereof and an emulsifier. Optionally, the composition of the present invention can further include a fat ingredient. The composition of the present invention can be produced by mixing the desired ingredients, homogenizing the resulting mixture, sterilizing the homogenized mixture, and then cooling.

Since the cheese-containing composition of the present invention is in the form of a homogenized O/W emulsion having excellent whipping properties, a cheese cake and other desserts having a rich body and good quality can be readily and consistently obtained by simply whipping the composition, mixing it with other appropriate ingredients and, optionally, baking the resulting mixture.

The cheese to be used in the present invention may be a natural cheese such as cream cheese and cottage cheese, or a process cheese, or an artificial cheese (a filled cheese, an imitation cheese) and a mixture thereof. In view of the taste of the product to be obtained, it is preferable to use a natural cheese, particularly, a cream cheese of a high fat content. A similar artificial cheese is also preferable. For example, an artificial cheese obtained by using soybean protein as a protein component and/or that obtained by a vegetable fat as a fat component are preferable from nutritive and healthful viewpoints. When a cheese of a low fat content such as cottage cheese or the like is used, fats and oils can be appropriately supplemented and a ripened cheese such as Edam cheese, Gouda cheese or the like can be also admixed so that taste of the product can be enhanced. In the present invention, it is preferable to use the cheese in an amount of 10 to 70% by weight based on the total amount of the composition.

The liquid phase of the composition is a member selected from the group consisting of milk, skim milk, water and a mixture thereof. As milk or skim milk, there can be also used a mixture of powdered whole or skim milk with water. The liquid phase is preferably present in an amount of 90 to 30% by weight based on the total amount of the composition.

As the emulsifier, a known emulsifier which can provide whipping properties to the composition such as lecithin, a glycerin fatty acid ester (e.g. glycerin $C_{12}$-$C_{18}$ fatty acidester), a sucrose fatty acid ester (e.g. sucrose $C_{12}$-$C_{18}$ fatty acid ester), a propylene glycol fatty acid ester (e.g. propylene $C_{18}$ fatty acid ester), a sorbitan fatty acid ester (e.g. sorbitan $C_{12}$-$C_{18}$ fatty acid ester), or the like can be used. Particularly, the combination of lecithin and a sucrose fatty acid ester is preferable. Another emulsifier such as a polyglycerol fatty acid ester (e.g. polyglycerol $C_{12}$-$C_{18}$ fatty acid ester having 3–10 of polymerization degree of glycerin) or a polyoxyethylene sorbitan fatty acid ester (e.g. Tween 20, 21, 40, 60, 61, 65, 80, 81 and 85 made by Atlas Powder Co.) can be also used. The emulsifier is used in such an amount that over-run of the whipped composition becomes 30% to 100% and, in general, in an amount of 0.1 to 3% by weight based on the total amount of the composition.

Besides, when margarine, an artificial cream or the like is added to the composition as a fat ingredient as described hereinafter, addition of the emulsifier is scarcely needed since a sufficient amount of the emulsifier has been contained in the fat ingredient. Likewise, when egg yolk is added, addition of the emulsifier may be omitted.

In the present invention, addition to the above ingredients, it is preferable to add a fat ingredient to the emulsion so as to enhance the taste of the product. The fat ingredient preferably has a melting point of 15° to 40° C. In general, the ingredient may be edible animal and vegetable fats and oils and these fats and oils can be used alone or in combination. Further, the ingredient may be these fats and oils treated by a conventional method such as hydrogenation, fractionation and/or transesterification. Examples of these fats and oils are rape seed oil, soybean oil, cotton seed oil, palm oil, peanut oil, corn oil, coconut oil, palm kernel oil, fish oil, beef tallow, lard and the like. However, in view of taste, butter, margarine, cream or the like is more preferable.

The fat ingredient is preferably present in an amount of 10% to 40% by weight based on the total amount of the composition.

Further, sugar can be also included in the composition so that addition of sugar is not required when a cheese cake or another dessert is made by using the composition.

In order to produce the cheese-containing composition of the present invention, the above ingredients are mixed and then homogenized according to a conventional method. For example, the mixture of the ingredients is preliminarily emulsified by a homomixer at 65° to 70° C. and then homogenized by a homogenizer at 50° to 70° C. under a pressure of 0 to 40 kg/cm$^2$. The emulsion thus obtained is sterilized by a conventional method such as a batch-wise method, HTST method or UHT method. For example, in case of putting the composition to use within a short period of time after the production, the emulsion can be sterilized by heating at 60° to 65° C. for about 30 minutes according to a batch-wise method. When a longterm preservation is required, the emulsion can be sterilized by heating at 70° to 80° C. for 16 to 120 seconds according to HTST method or heating at 130° C. to 145° C. for 2 to 4 seconds according to the UHT method. Particularly, direct heating of the UHT method is preferable since, by indirect heating, protein in the emulsion is liable to be denatured which results in undesirable increased viscosity and poor dispersion properties of the composition. Then, the sterilized emulsion is again homogenized, if necessary, and cooled to 5° C. to 25° C. by a conventional method to obtain the desired cheese-containing composition. The composition thus produced is packed in a suitable package.

A cheese cake and other desserts can be readily made by using the cheese-containing composition of the present invention. For example, a soufflé type cheese cake can be made by whipping the composition to attain a desired degree of over-run, admixing the whipped composition with other ingredients such as wheat flour, salt, egg and the like, followed by meringue, if necessary, and then baking the resulting mixture. A rare type cheese cake having fine and uniform texture can be also readily made by whipping the composition to attain a desired degree of over-run and admixing the whipped composition with other ingredients such as lemon juice, orange juice, wine and/or gelatin.

The following examples further illustrate the present invention in detail but are not to be construed to limit the scope thereof. In the examples, all "parts" are by weight unless otherwise stated.

EXAMPLE 1

Milk (20 parts) and an artificial cream (manufactured by Fuji Oil Company Limited under the trade name of "Fuji Sunny Topping", 20 parts) were mixed and warmed to about 65° C. To the mixture was slowly added cream cheese (40 parts) while stirring with a homomixer. To the resulting emulsifier mixture was further added margarine (manufactured by Fuji Oil Company Limited under the trade name of "Fujisanie CONBOL", 9 parts), sugar (6 parts) and egg yolk (5 parts). After emulsification of the mixture with the homomixer, the resulting emulsion was homogenized at 65° C. under a pressure of 30 kg/cm$^2$. The homogenized mixture was sterilized at 145° C. for 3 seconds by directly heating the mixture with UHT sterilization apparatus (manufactured by Alfa-Laval under the trade name "VTIS"). The sterilized mixture was again homogenized under a pressure of 10 kg/cm$^2$ while it was hot and then cooled to about 15° C. to obtain the desired cheese-containing composition.

A soufflé type cheese cake was made by using the above-obtained cheese-containing composition as follows:

The composition (1,000 parts) was whipped to attain 40% of over-run. The whipped composition was admixed with wheat flour (120 parts) and to the mixture were added a custard like material which was prepared by cooking a mixture of whole egg (180 parts), corn starch (110 parts), sugar (80 parts) and milk (750 parts), followed by admixing with meringue made from egg white (200 parts) and sugar (100 parts). The resulting mixture was lightly mixed, poured into a 8 inch round mold and then baked at 160° C. for 50 minutes.

The cheese cake thus obtained was in natural baked color, showed good gloss and had fine texture and rich volume. Even if it was cooled, volume shrinkage was not observed.

Further, a rare type cheese cake was made by using the above-obtained cheese-containing composition as follows:

The composition (1,000 parts) was whipped to attain 47% of over-run. The whipped composition was admixed with gelatin which was prepared by soaking a gelatin plate (25 parts) in an appropriate amount of water and lemon juice (40 parts). The mixture was poured into a mold and cooled to obtain a rare cheese cake.

The rare type cheese cake thus obtained had fine texture.

Furthermore, a dessert (Peach parfait) was made as follows

The above-obtained cheese-containing composition (500 ml) was whipped to 80% of over-run. The whipped composition was admixed with peach boiled in syrup (3 pieces) which was previously chopped, orange juice (30 ml) and cointreau (30 ml). Separately, a boiled syrup prepared by sugar (120 g) and water (180 ml) was slowly added to egg yolk (corresponding to 5 yolks) while whipping, and whipping was continued until the mixture got cold. This was mixed with the above-prepared mixture. The resultant was distributed to suitable cups and frozen.

Orange sauce was prepared by mixing chopped orange peel and juice (corresponding to 1 fruit) and sugar (80 g), heating the mixture, mixing the heated mixture with corn starch (20 g) dispersed in an appropriate amount of water, straining the resultant and cooling.

An appropriate amount of the orange sauce was poured on the above frozen mixture in the cup and the cup was again frozen to prepare the desired Peach parfait.

EXAMPLE 2

The same procedure as described in Example 1 was repeated except that cream cheese (30 parts) and Gouda cheese (10 parts) were substituted for cream cheese (40 parts) to obtain the desired cheese-containing composition having rich and thick taste. This composition was useful for a soufflé type cheese cake making.

What is claimed is:

1. A cheese-containing composition in the form of a homogenized oil-in-water type emulsion which consists essentially of (a) 10 to 70% by weight of a cheese component selected from the group of natural cheese, artificial cheese and mixtures thereof, (b) 30 to 90% by weight of a liquid selected from the group of milk, skim milk, water and a mixture thereof, (c) 0.1 to 3% by weight of an emulsifier selected from the group of lecithin, a glycerin fatty acid ester, a sucrose fatty acid ester, a propylene glycol fatty acid ester, a sorbitan fatty acid ester, a polyglycerol fatty acid ester, a polyoxyethylene sorbitan fatty acid ester and a mixture thereof and (d) from 0 to 40% by weight of a fat ingredient, all the percentages being based on the composition.

2. A cheese-containing composition according to claim 1, wherein the cheese component is a member selected from cream cheese and an artificial cream cheese.

3. A cheese-containing composition according to claim 1, wherein the composition includes 10 to 40% by weight of a fat ingredient.

4. A cheese-containing composition according to claim 3, wherein the fat ingredient is a member selected from the group consisting of edible animal and vegetable fats and oils, artificial fats and oils, butter, margarine, cream and a mixture thereof.

5. A process for producing a cheese-containing composition in the form of a homogenized oil-in-water type emulsion which consists essentially of mixing (a) 10 to 70% by weight of a cheese component selected from the group of natural cheese, artificial cheese and mixtures thereof, (b) 30 to 90% by weight of a liquid selected from the group of milk, skim milk, water and a mixture thereof, (c) 0.1 to 3% by weight of an emulsifier selected from the group of lecithin, a glycerin fatty acid ester, a sucrose fatty acid ester, a propylene glycol fatty acid ester, a sorbitan fatty acid ester, a polyglycerol fatty acid ester, a polyoxyethylene sorbitan fatty acid ester and a mixture thereof, and (d) 0 to 40% by weight of a fat ingredient, all the percentages being based on the weight of the resulting mixture, homogenizing the mixture, sterilizing the homogenized mixture and then cooling.

6. A process according to claim 5, wherein there is admixed with the cheese component, the liquid and the emulsifier, a fat ingredient in an amount of 10 to 40% by weight of the composition.

7. A process for producing a cheese-containing composition according to claim 5, wherein the sterilization is carried out at 130 to 145° C. for 2 to 4 seconds by directly heating according to the UHT method.

* * * * *